(12) United States Patent
Chen et al.

(10) Patent No.: US 10,677,401 B2
(45) Date of Patent: Jun. 9, 2020

(54) LIGHTING SYSTEM WITH WIRELESS POWER SUPPLY

(71) Applicant: LEDVANCE GmbH, Garching bei Munchen (DE)

(72) Inventors: Shaoping Chen, Shenzhen Guangdong (CN); Shijun Nie, Shenzhen Guangdong (CN); Fan Xin, Shenzhen Guangdong (CN)

(73) Assignee: LEDVANCE GMBH, Garching bei Munchen (DE)

( * ) Notice: Subject to any disclaimer, the term of this patent is extended or adjusted under 35 U.S.C. 154(b) by 138 days.

(21) Appl. No.: 15/884,715

(22) Filed: Jan. 31, 2018

(65) Prior Publication Data
US 2018/0231194 A1   Aug. 16, 2018

(30) Foreign Application Priority Data
Feb. 16, 2017   (CN) .................. 2017 1 00848457

(51) Int. Cl.
| | |
|---|---|
| *F21L 4/08* | (2006.01) |
| *H05B 45/37* | (2020.01) |
| *H02J 50/40* | (2016.01) |
| *F21S 6/00* | (2006.01) |
| *H02J 7/00* | (2006.01) |
| *H02J 7/02* | (2016.01) |
| *H02J 50/20* | (2016.01) |
| *H02J 50/10* | (2016.01) |

(52) U.S. Cl.
CPC ............. *F21L 4/08* (2013.01); *F21S 6/002* (2013.01); *H02J 7/0013* (2013.01); *H02J 7/025* (2013.01); *H02J 50/40* (2016.02); *H05B 45/37* (2020.01); *H02J 50/10* (2016.02); *H02J 50/20* (2016.02)

(58) Field of Classification Search
CPC .... F21L 4/08; H02J 50/10; H02J 50/20; H02J 50/40; H02J 7/0013; H02J 7/025; F21S 6/002; H05B 33/0809; H05B 45/37
USPC .................................................. 307/22, 104
See application file for complete search history.

(56) References Cited

U.S. PATENT DOCUMENTS

| | | |
|---|---|---|
| 9,124,125 B2 | 9/2015 | Leabman et al. |
| 2013/0175937 A1 | 7/2013 | Nakajo et al. |
| 2016/0100312 A1 | 4/2016 | Bell et al. |

FOREIGN PATENT DOCUMENTS

WO   2012056365 A2   5/2012

*Primary Examiner* — Hal Kaplan
(74) *Attorney, Agent, or Firm* — Hayes Soloway PC

(57) ABSTRACT

A lighting system comprises a primary luminaire and a secondary luminaire each having a light source. Electrical power can be transmitted wirelessly via an inductive wireless power transmission from the primary to the secondary luminaire. Electrical power can also be transmitted wirelessly via an RF wireless power transmission from a RF wireless power transmitter to both luminaires. Energy can be stored in energy storage means. Thus, true wireless lighting can be achieved.

11 Claims, 3 Drawing Sheets

LIGHTING SYSTEM WITH WIRELESS POWER SUPPLY

CROSS-REFERENCE TO RELATED APPLICATIONS AND PRIORITY

This patent application claims the benefit of and priority to Chinese Patent Application No. 2017100848457 filed on Feb. 16, 2017, the entire disclosure of which is incorporated herein by reference.

Technical Field

The present invention relates to a lighting system using wireless power supply. In particular, the invention relates to a lighting system having two luminaires, wherein electrical power can be transmitted from one luminaire to the other.

Background

Wireless charging of electronic devices is in particular known for smartphones and other small electronic devices which either include an inductive wireless power receiver or can be attached to such a receiver. When such a device is positioned on a corresponding inductive wireless power transmitter, electrical power is wirelessly transferred from the inductive wireless power transmitter to inductive wireless power receiver and used to charge and/or operate the device. Inductive wireless power transfer is limited in its applicability in that the coils of transmitter and receiver must be aligned with respect to each other. Inductive wireless power transmitters can be built into furniture and into electronic devices.

US 2013/0175937 A1 teaches a wireless power supply system for lighting, wherein a base containing a wireless power transmitter with an array of coils is disclosed and lighting devices can be placed on the base power wireless power supply.

WO 2012/056365 A2 discloses a wireless electrical power supply unit in particular for a light emitting carpet.

Previously known wireless power supply systems, however, lack the flexibility desired by many users. While it usually does not matter where a user must put his smartphone for charging, for lighting devices even subtle position changes may influence the lighting effect achieved by the lighting devices.

SUMMARY OF THE INVENTION

In view of the known prior art, it is an object of the present invention to provide a lighting system allowing a much higher degree of flexibility in positioning.

This object is solved by a lighting system according to the independent claim. Preferred embodiments are given by the dependent claims and the following description.

A lighting system according to the present invention comprises at least two luminaires, a primary luminaire and one or more secondary luminaires. The term "luminaire" is used to describe an electrical device used to create artificial light by use of an electric lamp. Some luminaires can be attached to a wall or a ceiling, while other luminaires can be put on a surface, for example onto a table or desk. Luminaires colloquially are often referred to as "lamps." However, the term "lamp" in a technical sense means the actual light source.

A primary luminaire of the lighting system (for example a table lamp or a desk lamp) has a first light source and an induction wireless power transmitter. The one or more secondary luminaires each have a second light source, an energy storage means (for example a rechargeable battery pack, in particular a lithium polymer (LiPo) rechargeable battery pack), and an induction wireless power receiver.

In the following, the lighting system is described as having one secondary luminaire only. It should be understood that all the features and concepts described below are equally applicable in the case of more than one secondary luminaire.

The induction wireless power transmitter located in the primary luminaire and the induction wireless power receiver located in the secondary luminaire together are operable to transmit electrical power from the primary luminaire to the secondary luminaire. This induction wireless power transfer corresponds to the known induction wireless power transfer and is, therefore, not described in detail.

The secondary luminaire is separable from the primary luminaire. Since the secondary luminaire comprises an energy storage means, electrical energy transferred wirelessly from the primary luminaire to the secondary luminaire can be stored in the energy storage means. Thus, the secondary luminaire can be operated even when separated from the primary luminaire. Only for charging the energy storage means, the secondary luminaire must be brought into a position to allow inductive wireless power transfer from the induction wireless power transmitter of the primary luminaire to the induction wireless power receiver of the secondary luminaire.

The secondary luminaire can, thus, be used as portable lighting, for example as cabinet light, night light, flashlight and atmosphere light (mood light). Accordingly, the lighting system according to the present invention provides more flexibility in choosing a desired lighting scenario than previously known systems.

In a preferred embodiment, the lighting system further comprises a radio frequency (RF) wireless power transmitter. In addition, the primary luminaire and/or the secondary luminaire (in other words, at least one of the primary luminaire and the secondary luminaire) further comprises an RF wireless power receiver. The RF wireless power receiver is adapted to cooperate with the RF wireless power transmitter and to wirelessly receive power transmitted by the RF wireless power transmitter.

RF wireless power transfer has been shown to work over distances as far as 4.6 m (15 feet) without the directivity associated with inductive wireless power transfer. Up to 2 W of electrical power can be transferred using such RF wireless power transfer systems. This technology is explained, for example, in U.S. Pat. No. 9,124,125 B2 and US Patent Application 2016/100312 A1.

Depending on the light source (and in particular for an LED light source), 2 W may be sufficient power for operating the light source.

Using an RF wireless power transfer system further increases the flexibility for positioning the luminaires of the lighting system according to the present invention. Since electrical power can be transmitted by the RF wireless power transmitter to the primary luminaire as well as the secondary luminaire, both luminaires can be placed free from restrictions such as mains outlet position, cable length, relative position of induction coils, etc. present in the prior art.

Transmitting up to 2 W of electrical power by RF wireless power transfer, as mentioned above, is in particular sufficient for a luminaire intended to be used as cabinet light, night light, flashlight and atmosphere light (mood light) as is particularly envisioned for the secondary luminaire.

If one of the luminaires is to be used as a desk lamp or a table lamp, as is particularly envisioned for the primary luminaire, 2 W of electrical power might not be enough to achieve a desired brightness even with LEDs. Using current state of the art LEDs, an electrical power of about 6 W to about 10 W is usually required. In order to transfer more than 2 W of electrical power, several approaches can be applied, including those of the preferred embodiments described hereinafter.

In one such preferred embodiment the RF wireless power receiver of the primary luminaire and/or secondary luminaire comprises two or more RF wireless power receiver units. Each of the RF wireless power receiver units can be adapted to wirelessly receive up to 2 W of electrical power. The corresponding luminaire further comprises an energy storage unit (for example a capacitor) for combining and storing the electrical power wirelessly received by the RF wireless power receiver units. Preferably, the RF wireless power receiver units are connected to the energy storage unit in parallel. The luminaire further comprises a DC current converter for converting the current provided by the energy storage unit into a current suitable for operating the light source. Thus, more than 2 W of electrical power may be transferred from the RF wireless power transmitter to the luminaire.

In another preferred embodiment, the RF wireless power receiver of the primary luminaire and/or secondary luminaire comprises two or more RF wireless power receiver units. The luminaire further comprises two or more DC current converters and two or more light sources. Each DC current converter is associated with one or more light sources and each DC current converter is associated with one of the RF wireless power receiver units. Thus, each DC current converter can be operable to convert an output current of the associated RF wireless power receiver unit into a current suitable for operating the associated light sources. Essentially, the lighting unit of the luminaire (comprising the RF wireless power receiver units, the DC current converters, and the light sources) can be seen as several independent lighting sub-units which together provide the full illumination of the luminaire. Accordingly, more than 2 W of electrical power may be transferred from the RF wireless power transmitter to the luminaire.

In a preferred embodiment the RF wireless power transmitter and the RF wireless power receiver (or RF wireless power receiver units) are operable in a frequency range between about 2.4 GHz and about 5.8 GHz. This frequency range has been shown to be particularly suitable for RF wireless power transfer.

In embodiments where the light source of the primary and/or secondary luminaire can be operated with 2 W or less, the wirelessly transferred electrical power can be used directly for operating the light source. Preferably, however, the luminaire comprises an energy storage means, for example a rechargeable battery pack, in particular a LiPo rechargeable battery pack. The typical voltage range for LiPo rechargeable battery packs is between about 2.5 V and about 4.2 V. In order to keep the operation of the light source stable during the charging and discharging of the energy storage means, a power converter can be provided for converting the electrical power received by the wireless power receiver. Preferably, the output power of the power converter is suitable for charging the energy storage means and/or for operating the second light sources.

In a preferred embodiment the power converter has a buck/boost topology, for example Buck-Boost, Ćuk, Zeta, Sepic or any other suitable topology.

In a preferred embodiment, the primary luminaire further comprises an electrical input for mains power and an AC-DC power supply circuit for converting the mains power into DC power suitable for operating the inductive wireless power transmitter and the first light source. A primary luminaire equipped with a mains power input and a corresponding power supply circuit allows to operation of the luminaire with mains power when available and suitable.

In a preferred embodiment, the primary luminaire and the secondary luminaire each comprise a control circuit for selecting the power source used for operating the respective luminaire. For a primary luminaire equipped with mains power input and RF wireless power receiver, the control circuit may operate the luminaire with mains power as long as the luminaire is plugged into the mains socket even when RF wireless power transfer is available. As soon as the primary luminaire is removed from mains power, the control circuit switches to a state where the luminaire is wirelessly supplied with electrical power via the RF wireless power receiver.

For a secondary luminaire equipped with inductive wireless power receiver and RF wireless power receiver, the control circuit may operate the luminaire with electrical power wirelessly received by the inductive wireless power receiver (for example, as long as the secondary luminaire is suitably positioned with respect to the primary luminaire). Once the secondary luminaire is removed from its position on or close to the primary luminaire, the control circuit switches to a state where the luminaire is wirelessly supplied with electrical power via the RF wireless power receiver.

While in the above description, the invention has been described such that electrical power is wirelessly transferred to a luminaire, the wireless power transmitters (i.e., the inductive wireless power transmitter of the primary luminaire and/or the RF wireless power transmitter) can additionally be used for transferring electrical power to other electronic devices which are equipped with corresponding wireless power receivers, such as a mobile phones, an electric toothbrush, wireless (e.g., Bluetooth) earphones.

BRIEF DESCRIPTION OF THE DRAWINGS

Preferred embodiments of the invention will be explained in the following, having regard to the drawings. It is shown in.

DETAILED DESCRIPTION OF THE INVENTION

In the following, preferred embodiments of the invention will be described with reference to the drawings. The same or similar elements or elements having the same effect may be indicated by the same reference number in multiple drawings. Repeating the description of such elements may be omitted in order to prevent redundant descriptions.

Figure 1:
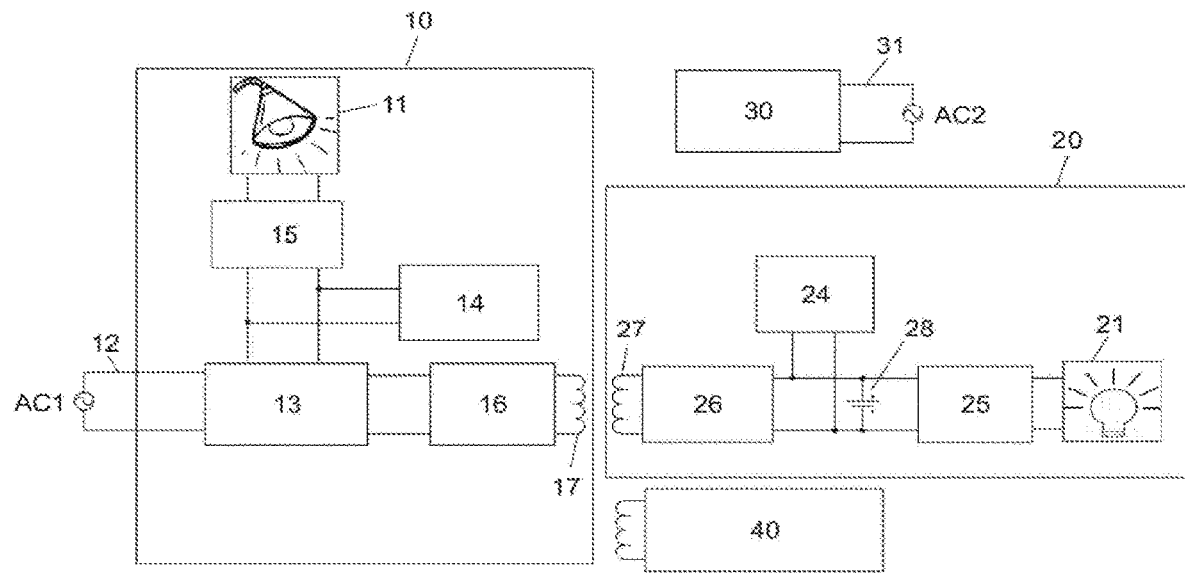
FIG. 1 a schematic view of a preferred embodiment of a lighting system according to the present invention.

A schematic view of a preferred embodiment of a lighting system according to the present invention is shown in FIG. 1. The lighting system comprises a primary luminaire 10 and a secondary luminaire 20. The primary luminaire 10 can be used as a desk lamp. The primary luminaire 10 is provided with a light source 11 which comprises one or more LEDs. The primary luminaire 10 can be supplied with electrical power by means of mains power AC1 when power cord 12 is plugged into a mains socket. An AC-DC power supply circuit 13 then converts the mains power into DC power suitable for the operation of the primary luminaire 10.

Alternatively, the primary luminaire 10 can be supplied with electrical power by means of RF wireless power transmission. An RF wireless power receiver 14 included in the primary luminaire 10 can receive electrical power wirelessly transmitted by an RF wireless power transmitter 30.

The RF wireless power transmitter 30 is connected to mains power AC2. The RF wireless power transmitter 30 can be equipped with a power cord 31 which can be plugged into a mains socket. Alternatively, the RF wireless power transmitter 30 can be fixedly installed with electrical connection to mains power. For example, the RF wireless power transmitter 30 can be part of or included in a fixedly installed luminaire.

If necessary, the primary luminaire 10 can be provided with a DC current converter 15 for converting the current provided by either the RF wireless power receiver 14 or the AC-DC power supply circuit 13 into a current suitable for operating the light source 11.

Further included in the primary luminaire 10 is an inductive wireless power transmitter 16 comprising a coil 17. The inductive wireless power transmitter 16 is electrically connected to the AC-DC power supply circuit 13 and can be used to wirelessly transfer power to, e.g., a secondary luminaire 20 of the lighting system. The inductive wireless power transmitter 16 could also be used to wirelessly transfer power to another electronic device 40 equipped with an inductive wireless power receiver. Electronic device 40 is not part of the inventive lighting system, but is included in FIG. 1 to demonstrate an additional advantage of the inventive lighting system.

The secondary luminaire 20 comprises an inductive wireless power receiver 26 which is compatible with the inductive wireless power transmitter 16 of the primary luminaire 10 and allows to wirelessly receive electrical power transmitted by the inductive wireless power transmitter 16.

Alternatively, electrical power can be transferred to the secondary luminaire 20 using RF wireless power transfer. An RF wireless power receiver 24 included in the secondary luminaire 20 can receive electrical power wirelessly transmitted by the RF wireless power transmitter 30.

Electrical power wirelessly transferred to the secondary luminaire 20 is—if required—converted by power converter 25 and either stored in energy storage means 28 such as a LiPo rechargeable battery pack or used for operating the light source 21 of the secondary luminaire 20 directly.

The light source 21 of the secondary luminaire 20 comprises one or more LEDs.

For charging the energy storage means 28, electrical power can be transferred to the secondary luminaire 20 either via inductive wireless power transfer when the primary luminaire 10 and the secondary luminaire 20 are positioned relative to each other such that the respective coils 17 and 27 of the inductive wireless power transmitter 16 and the inductive wireless power receiver 26 are suitably arranged next to each other. Otherwise electrical power can be transferred to the secondary luminaire 20 via RF wireless power transfer.

When the energy storage means 28 is at least partially charged, the secondary luminaire 20 can be used as a portable lamp (if necessary after detaching it from the primary luminaire 10) even in places where RF wireless power transfer is not available.

Figure 2:
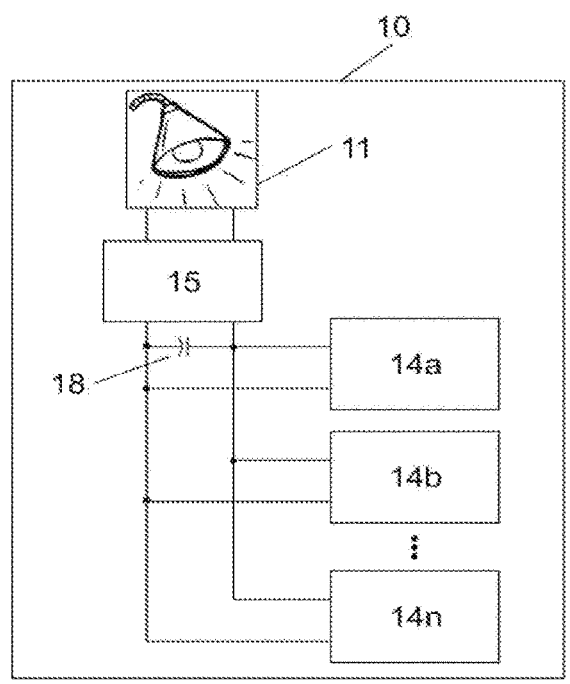
FIG. 2 a schematic view of a first embodiment of the RF wireless power transfer part of the primary luminaire.

FIG. 2 shows a schematic view of a first embodiment of the RF wireless power transfer part of the primary luminaire 10 that allows more than 2 W of electrical power to be transmitted via RF wireless power transfer. Other parts of the primary luminaire 10 are not shown in this drawing, but can of course still be present.

The RF wireless power receiver comprises multiple RF wireless power receiver units $14a$, $14b$, ..., $14n$. Each of the RF wireless power receiver units $14a$, $14b$, ..., $14n$ can receive up to 2 W of electrical power. The power received by the RF wireless power receiver units $14a$, $14b$, ..., $14n$ can be stored in an energy storage unit 18 (here shown as a capacitor) to which the RF wireless power receiver units $14a$, $14b$, ..., $14n$ are connected in parallel. The luminaire 10 further comprises a DC current converter 15 for converting the current provided by the energy storage unit 18 into a current suitable for operating the light source 11. While any number of RF wireless power receiver units $14a$, $14b$, ..., $14n$ may be employed, using 3, 4, or 5 RF wireless power receiver units $14a$, $14b$, ..., $14n$ (for transferring from about 6 W to about 10 W) is particularly preferred.

Figure 3:
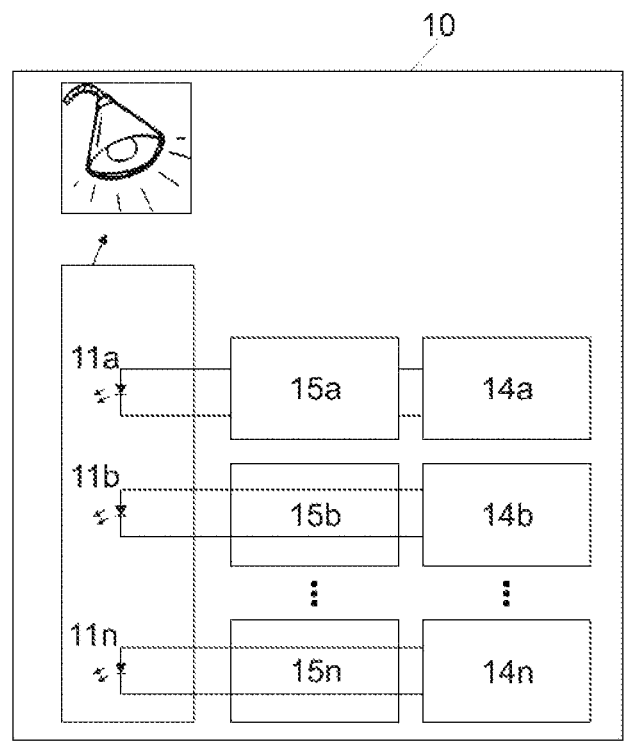
FIG. 3 a schematic view of a second embodiment of the RF wireless power transfer part of the primary luminaire.

FIG. 3 shows a schematic view of a second embodiment of the RF wireless power transfer part of the primary luminaire 10 that allows more than 2 W of electrical power to be transmitted via RF wireless power transfer. Other parts of the primary luminaire 10 are not shown in this drawing, but can of course still be present.

The RF wireless power receiver in this embodiment comprises multiple RF wireless power receiver units $14a$, $14b$, ..., $14n$. Each of the RF wireless power receiver units $14a$, $14b$, ..., $14n$ can receive up to 2 W of electrical power. Each RF wireless power receiver unit $14a$, $14b$, ..., $14n$ is connected to an associated DC current converter $15a$, $15b$, ..., $15n$ which, in turn, is connected to an associated light source $11a$, $11b$, ..., $11n$. The output current of each RF wireless power receiver unit $14a$, $14b$, ..., $14n$ is converted by the respective DC current converter $15a$, $15b$, ..., $15n$ into a current suitable for operating the respective light source $11a$, $11b$, ..., $11n$. While any number of RF wireless power receiver units $14a$, $14b$, ..., $14n$ may be employed, using 3, 4, or 5 RF wireless power receiver units $14a$, $14b$, ..., $14n$ (for transferring from about 6 W to about 10 W) and, accordingly the same number of DC current converters $15a$, $15b$, ..., $15n$ and light sources $11a$, $11b$, ..., $11n$ is particularly preferred.

Figure 4:
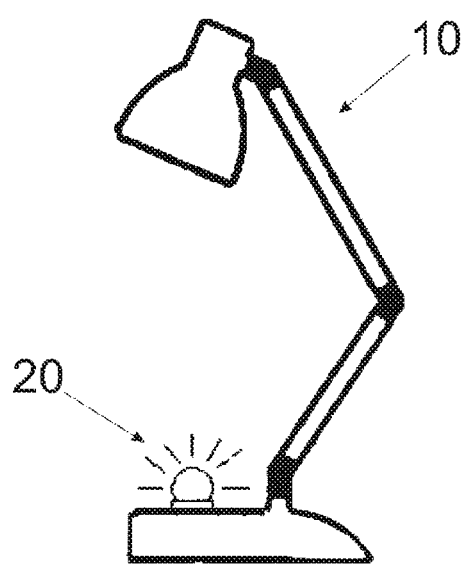
FIG. 4 a schematic view of the design of a lighting system according to the present invention.

A schematic view of an exemplary design of a lighting system according to the present invention is shown in FIG. 4. The primary luminaire 10 of this design is a desk lamp having its light source 11 arranged in a shade at the end of an adjustable arm. The base of the desk lamp may contain the further electronic components such as AC-DC power supply circuit, RF wireless power receiver, induction wireless power transmitter, etc.

The base further may comprise a recess into which the secondary luminaire 20 can be inserted. The secondary luminaire 20 is a small portable lamp with a bulb-like translucent cover containing the light source and a housing portion containing the further electronic components such as RF wireless power receiver, induction wireless power receiver, power converter, rechargeable battery pack etc.

When the secondary luminaire 20 is inserted into the recess in the base of the primary luminaire 10, the respective coils of the inductive wireless power transmitter and receiver are located next to each other so that electrical power can be transferred wirelessly from the primary luminaire 10 to the secondary luminaire 20. When the secondary luminaire 20 is removed from the recess in the base of the primary luminaire 10, the light source of the secondary luminaire 20 may be operated either by means of the rechargeable battery pack or by wirelessly transmitted power received by the RF wireless power receiver.

FIGS. 5a-5d depict schematic circuit diagrams showing power converter circuits using a Buck-Boost, Ćuk, Zeta, and Sepic topology, respectively. These power converter circuits are usable for converting the electrical power received by the RF and/or inductive wireless power receiver into power suitable for charging the energy storage means and/or for operating the light sources.

Figure 5A:
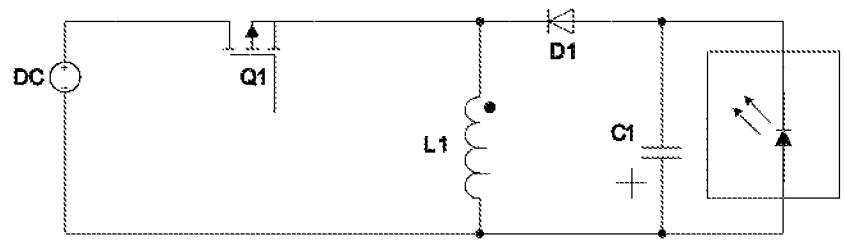
FIGS. 5a-5d schematic circuit diagrams showing power converter circuits using a Buck-Boost, Ćuk, Zeta, and Sepic topology, respectively.

In the Buck-Boost power converter circuit shown in FIG. 5a, a switching device Q1 (e.g., a MOSFET) and an inductor L1 are connected in series between both poles of the input DC, wherein the switching device Q1 is connected to the positive side of the input DC and the inductor L1 is connected to the negative side of the input DC. A diode D1 is connected with its cathode between the switching device Q1 and the inductor L1. An output capacitor C1 is connected with one electrode to the anode of the diode D1 and the other electrode to the negative side of the input DC. An LED of the light source may then be connected in parallel to the output capacitor C1 of the Buck-Boost power converter circuit with its anode connected to the negative side of the input DC.

Figure 5B:
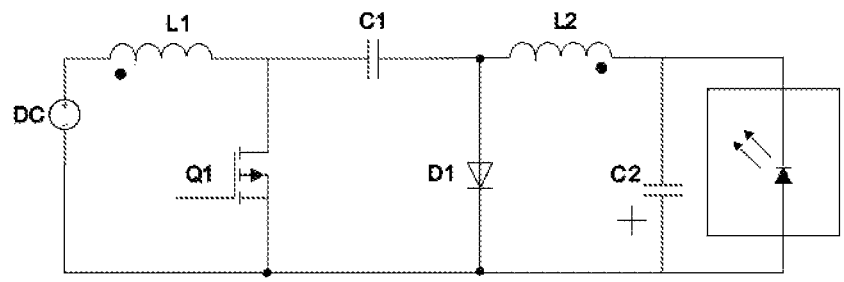

In the Ćuk power converter circuit shown in FIG. 5b, an inductor L1 and a switching device Q1 (e.g., a MOSFET) are connected in series between both poles of the input DC, wherein the inductor L1 is connected to the positive side of the input DC and the switching device Q1 is connected to the negative side of the input DC. A capacitor C1 is connected with one electrode between the inductor L1 and the switching device Q1. A diode D1 is connected with its anode to the other electrode of the capacitor C1 and its cathode to the negative side of the input DC. An inductor L2 is connected with one side to the anode of the diode D1. An output capacitor C2 is connected with one electrode to the inductor L2 and the other electrode to the negative side of the input DC. An LED of the light source may then be connected in parallel to the output capacitor C2 of the Ćuk power converter circuit with its anode connected to the negative side of the input DC.

Figure 5C:
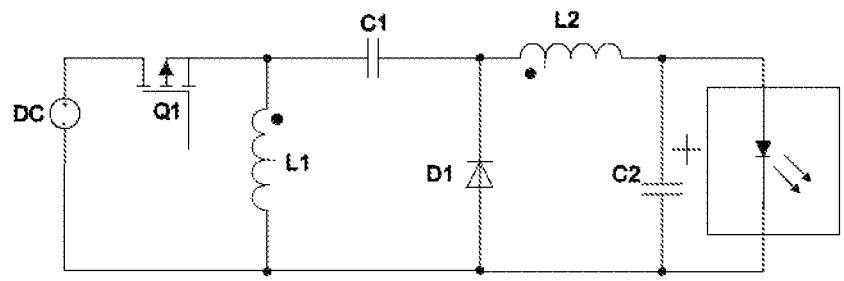

In the Zeta power converter circuit shown in FIG. 5c, a switching device Q1 (e.g., a MOSFET) and an inductor L1 are connected in series between both poles of the input DC, wherein the switching device Q1 is connected to the positive side of the input DC and the inductor L1 is connected to the negative side of the input DC. A capacitor C1 is connected with one electrode between the inductor L1 and the switching device Q1. A diode D1 is connected with its cathode to the other electrode of the capacitor C1 and its anode to the negative side of the input DC. An inductor L2 is connected with one side to the cathode of the diode D1. An output capacitor C2 is connected with one electrode to the inductor L2 and the other electrode to the negative side of the input DC. An LED of the light source may then be connected in parallel to the output capacitor C2 of the Zeta power converter circuit with its cathode connected to the negative side of the input DC.

Figure 5D:
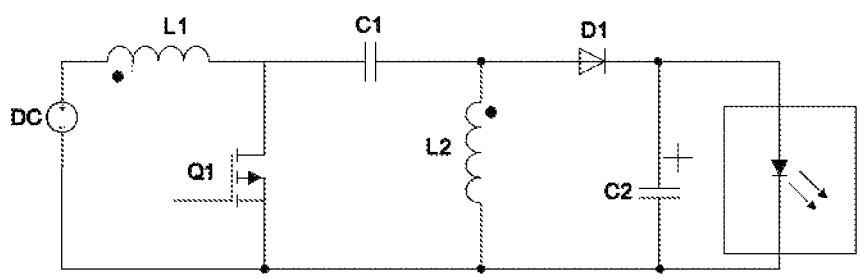

In the Sepic power converter circuit shown in FIG. 5d, an inductor L1 and a switching device Q1 (e.g., a MOSFET) are connected in series between both poles of the input DC, wherein the inductor L1 is connected to the positive side of the input DC and the switching device Q1 is connected to the negative side of the input DC. A capacitor C1 is connected with one electrode between the inductor L1 and the switching device Q1. An inductor L2 is connected with one side to the other electrode of the capacitor C1 and with its other side to the negative side of the input DC. A diode D1 is connected with its anode between the capacitor C1 and the inductor L2. An output capacitor C2 is connected with one electrode to the cathode of the diode D1 and the other electrode to the negative side of the input DC. An LED of the light source may then be connected in parallel to the output capacitor C2 of the Sepic power converter circuit with its cathode connected to the negative side of the input DC.

The output power from these power converter circuits can be determined by the duty cycle of the switching device Q1 depending on the input power. The exact operation of these power converter circuits is known to the skilled person and will not be repeated here.

The terms "wireless transmission of power" and "wireless transfer of power" (and variations thereof) are used in the present disclosure as synonyms.

Although the invention has been illustrated and described in detail by the embodiments explained above, it is not limited to these embodiments. Other variations may be derived by the skilled person without leaving the scope of the attached claims.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

LIST OF REFERENCE NUMERALS 10 primary luminaire
11 first light source
12 electrical input for mains power
13 AC-DC power supply circuit
14 RF wireless power receiver
15 DC current converter
16 induction wireless power transmitter
17 coil
18 energy storage unit
20 secondary luminaire
21 second light source
24 RF wireless power receiver
25 power converter
26 induction wireless power receiver
27 coil
28 energy storage means
30 RF wireless power transmitter
40 electronic device with induction wireless power receiver

The invention claimed is:

1. A lighting system comprising:
   a primary luminaire having a first light source and an induction wireless power transmitter; and
   one or more secondary luminaires having each a second light source, an energy storage means, and an induction wireless power receiver;
   wherein the induction wireless power transmitter and the induction wireless power receiver(s) are operable to transmit electrical power from the primary luminaire to the secondary luminaire(s); and
   wherein the secondary luminaire(s) is/are separable from the primary luminaire.

2. The lighting system according to claim 1, further comprising an RF wireless power transmitter, wherein at least one of the primary luminaire and the secondary luminaire(s) further comprises an RF wireless power receiver.

3. The lighting system according to claim 2, wherein the RF wireless power receiver comprises two or more RF wireless power receiver units, wherein the luminaire with the RF wireless power receiver comprises an energy storage unit and a DC current converter for converting the current provided by the energy storage unit into a current suitable for operating the light source.

4. The lighting system according to claim 2, wherein the RF wireless power receiver comprises two or more RF wireless power receiver units, wherein the luminaire with the RF wireless power receiver comprises two or more DC current converters and two or more light sources, each DC current converter being associated with one or more light sources, each DC current converter being associated with one of the RF wireless power receiver units and being operable to convert an output current of the RF wireless power receiver unit into a current suitable for operating the associated light sources.

5. The lighting system according to claim 2, wherein the RF wireless power transmitter and the RF wireless power receiver(s) are operable in a frequency range between about 2.4 GHz and about 5.8 GHz.

6. The lighting system according to claim 1, wherein the secondary luminaire(s) further comprise(s) a power converter for converting the electrical power received by the wireless power receiver(s) to be suitable for at least one of charging the energy storage means and operating the second light source(s).

7. The lighting system according to claim 6, wherein the power converter has a buck/boost topology.

8. The lighting system according to claim 1, wherein the primary luminaire further comprises an electrical input for mains power and an AC-DC power supply circuit for converting the mains power into DC power suitable for operating the inductive wireless power transmitter and the first light source.

9. The lighting system according to claim 1, wherein the primary luminaire and the secondary luminaire(s) each comprise a control circuit for selecting the power source used for operating the respective luminaire.

10. The lighting system according to claim 1, wherein the energy storage means of the secondary luminaire(s) is at least one of a rechargeable battery pack and a lithium polymer rechargeable battery pack.

11. The lighting system according to claim 1, wherein at least one of the first light source and the second light source(s) each comprises a light-emitting diode (LED).

* * * * *